United States Patent
Stuedal et al.

(10) Patent No.: US 10,711,949 B2
(45) Date of Patent: Jul. 14, 2020

(54) ARRANGEMENT OF AN UNMANNED AND REMOTELY OPERATED PRODUCTION FACILITY

(71) Applicant: Kværner AS, Lysaker (NO)

(72) Inventors: Odd Inge Stuedal, Trondheim (NO); Arne Budal, Trondheim (NO)

(73) Assignee: Kværner AS, Lysaker (NO)

( * ) Notice: Subject to any disclaimer, the term of this patent is extended or adjusted under 35 U.S.C. 154(b) by 0 days.

(21) Appl. No.: 16/318,177

(22) PCT Filed: Jul. 24, 2017

(86) PCT No.: PCT/EP2017/068609
§ 371 (c)(1),
(2) Date: Jan. 16, 2019

(87) PCT Pub. No.: WO2018/015569
PCT Pub. Date: Jan. 25, 2018

(65) Prior Publication Data
US 2019/0285229 A1    Sep. 19, 2019

(30) Foreign Application Priority Data
Jul. 22, 2016   (NO) .................................. 20161220

(51) Int. Cl.
*F17D 3/01*      (2006.01)
*F17D 1/13*      (2006.01)
(Continued)

(52) U.S. Cl.
CPC .............. *F17D 3/01* (2013.01); *E21B 43/013* (2013.01); *F17D 1/13* (2013.01); *F17D 1/14* (2013.01);
(Continued)

(58) Field of Classification Search
CPC .......... E21B 33/03; E21B 33/035; F17D 1/13; F17D 1/14; F17D 3/01; F17D 5/00; G05D 7/0652; G05D 7/0664
See application file for complete search history.

(56) References Cited

U.S. PATENT DOCUMENTS 6,397,948 B1    6/2002  Williams et al.
2011/0180253 A1*  7/2011  Adeyelure ......... B01D 19/0042
                                                          166/267
(Continued)

FOREIGN PATENT DOCUMENTS

EP    1430252 A1   6/2004
EP    2268374 A1   1/2011
(Continued)

OTHER PUBLICATIONS

Kecman, Ivan, "International Search Report," prepared for PCT/EP2017/068609, dated Oct. 19, 2017, three pages.

*Primary Examiner* — James G Sayre
(74) *Attorney, Agent, or Firm* — Ross T. Robinson

(57) ABSTRACT

An arrangement of an unmanned and remotely operated production facility comprising a wellhead platform including a wellhead assembly having an X-mas tree, a flowline transporting hydrocarbon fluids produced from a well via said wellhead assembly to one or more consecutive process equipment(s), and further on to a destination via a transport line. Any process equipment and/or pipeline section located at a higher level than said outlet point from said wellhead assembly, is arranged to either drain back to the x-mas tree, or drain downstream to said transport pipeline by assistance of respective valves arranged along said flowline.

9 Claims, 3 Drawing Sheets

(51) Int. Cl.
    *F17D 1/14*          (2006.01)
    *F17D 5/00*          (2006.01)
    *G05D 7/06*          (2006.01)
    *E21B 43/013*       (2006.01)
    *E21B 33/03*        (2006.01)

(52) U.S. Cl.
    CPC ............. *F17D 5/00* (2013.01); *G05D 7/0652* (2013.01); *G05D 7/0664* (2013.01); *E21B 33/03* (2013.01)

(56) References Cited

U.S. PATENT DOCUMENTS

2011/0192609 A1*   8/2011   Tan ....................... E21B 33/035
                                                            166/340
2015/0021040 A1*   1/2015   Johal .................... E21B 33/035
                                                             166/368

FOREIGN PATENT DOCUMENTS

| WO | WO-03029721 A1 | 4/2003 |
| WO | WO-2009133028 A1 | 11/2009 |
| WO | WO-2016028158 A1 | 2/2016 |

\* cited by examiner

ARRANGEMENT OF AN UNMANNED AND REMOTELY OPERATED PRODUCTION FACILITY

BACKGROUND

Field of the Invention

The present invention relates to an arrangement of an unmanned or normally unmanned and remotely operated production facility.

History of Related Art

For manned facilities, a dedicated closed drain system is well known technology for drainage of liquids from segments. This type of systems is in daily use in several locations. For such facilities, systems are manually drained prior to any intervention or during extended duration shutdowns. Liquids are typically routed to a closed drain system, which collects and disposes of any liquids remaining in the segment.

From patent application PCT/NO2015/050135 a concept for drainage of liquids from a wellhead assembly is described. The concept describes a continuously sloping pipe arrangement from wing valve to riser for drainage of liquids under the action of gravity. Such a design introduces restrictions to both the physical design and the use of certain process components, which have flow direction preferences.

The publication U.S. Pat. No. 6,397,948 disclose vent lines for depressurizing manifolds and flowlines of a subsea production system installed directly on the seabed.

SUMMARY

The present invention relates to an arrangement of an unmanned or normally unmanned and remotely operated production facility comprising a wellhead platform including a wellhead assembly having a X-mas tree, a flowline starting from an outlet point from the X-mas tree and transporting hydrocarbon fluids produced from a well via the wellhead assembly to one or more consecutive process equipment(s), and further on to a destination via a transport pipeline starting at a point located at a level lower than the outlet point.

The invention is also related to evacuation of liquids in a process system and more specifically evacuation of liquids from segments in a process system to other sections of the same process system and final pressure relief of the system.

The present concept which describes the system, the arrangement and a method for evacuating liquids in parts of a process system is typically applicable for use in situations where a shutdown of the process system is necessary, or that shut down of parts or components in the process system is necessary due to intrusive activities as maintenance and replacement of components.

According to the present invention an arrangement of an unmanned and remotely operated production facility of the introductory said kind is provided, which arrangement is distinguished in that any process equipment and/or pipeline section located at a higher level than the outlet point from the wellhead assembly, is arranged to either drain back to the x-mas tree, or drain downstream to the transport pipeline by assistance of respective valves arranged along the flowline.

Normally all the process equipment is arranged higher than outlet point A and point B but it is possible that some equipment can be lower than point A but still higher than point B.

At least one of the process equipment must be arranged higher than point A. (But normally most of the process equipments are arranged above point A).

Preferably, the process equipment may include components like meters, valves, sensors, manifolds, vessels, mechanical equipment or process assemblies.

Any process equipment low-level pockets is connected to a lower segment by use of respective actuatable short circuit valve and associated piping conducting fluids to a lower level.

In still another embodiment, the associated piping and circuit valve are short-circuited either to an upstream or to a downstream segment.

Moreover, the production facility may include an optional manifold receiving fluid from one or more additional wells and route to transport pipeline for transport to destination. Such destination can be a processing facility.

It is yet another embodiment of the invention that the arrangement further comprises a service line connected to the flowline for depressurizing the flowline and the process equipment after shutdown. The service line is preferably connected to the flowline at the proximity of the wing valve of the wellhead assembly.

Thus, the invention relates to a production system which design facilitates remote/unmanned operation for extraction of hydrocarbon fluids from reservoirs. The present invention eliminates requirement for a dedicated drainage system and continuously sloping piping. As such, the design allows for an arbitrary number of high points in the production piping, and a high degree of flexibility with regards to physical layout. This flexibility can be used to make the system more compact and/or to cater for upwards flowing installation requirements of inline components.

When shutting down a remote operated facilities e.g. for the purpose of intrusive maintenance or operational difficulties, it could be required to dispose of liquid hydrocarbon inventory by draining segments of, or the entire topside. On a manned facility, such draining will normally take place by an operator connecting hoses, or utilizing a permanent drain line to a drain system, which collects and disposes of the liquid. Such manual intervention is not suitable for remote operated facilities. Self-draining piping could be used, but could impose suboptimal restrictions to the layout design. The present invention provides a system design assembly comprising:

A conventional wellhead assembly (x-mas tree)
A fluid transport pipe (flowline)
Inline components such as valves, meters, detectors, transmitters, equipment and assemblies.
Optional manifold to collect fluid from several wells and route to transport pipeline connection
Connection to transfer pipeline to processing facility Between the conventional wellhead assembly and the transport pipeline there may be any number of local high points, which may or may not introduce pockets in the system. Any pocket low point is connected to a lower segment by use of actuated short circuit valve and piping.

With this arrangement, any liquid inventory trapped in low point can be remotely drained from the pockets in which it collects, without the use of a dedicated drainage system, and without imposing layout restrictions. Segments with local high points, but without a pocket, will self-drain to either side of the high point. Liquids can be drained back to the well, or to the transfer pipeline.

As a result of this invention the facility may be designed without a separate drainage system for reduced cost and operational complexity. It may also be designed with use of compact layouts and inline components where upwards flow is considered advantageous or mandatory.

The short circuit valve(s) may be activated manually by host platform operator, or automatically upon system trip/shutdown. For automatic draining, the system may be implemented by use of sequential valve operations to allow for liquid to drain into the transport pipeline prior to closing the final valve between the facility and the transfer pipeline. The duration of the delay(s) is specific for each facility and calculated based on factors such as liquid fraction, liquid holdup, pipe orientation, pipe dimension and length.

Other and further objects, features and advantages will appear from the following description of preferred embodiments of the invention, which is given for the purpose of description, and given in context with the appended drawings where:

DETAILED DESCRIPTION

Figure 1:
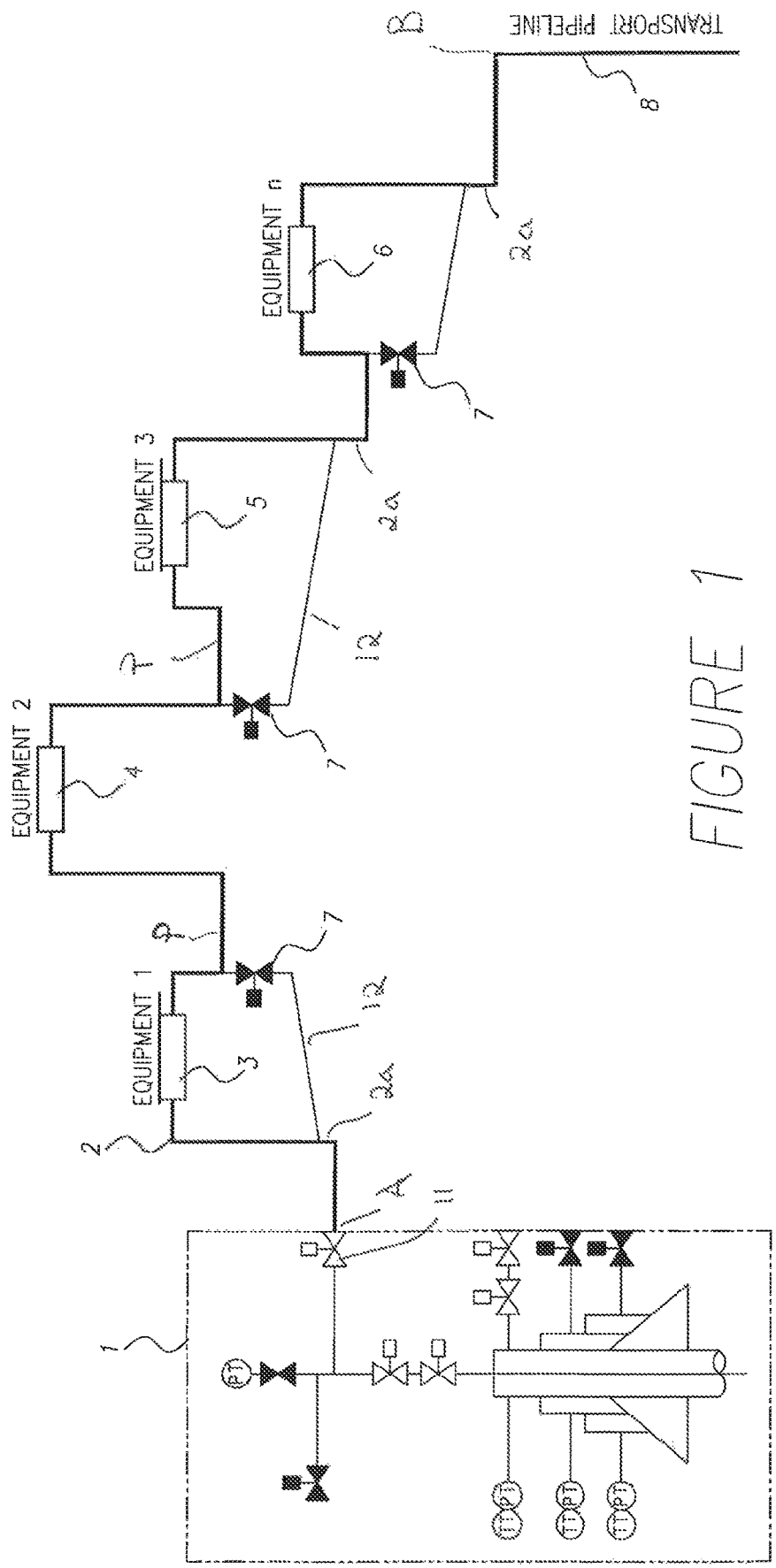
FIG. 1 shows in schematic view a wellhead platform with a wellhead assembly having a x-mas tree and pocketed piping and short-circuiting lines.

Reference is made to FIG. 1 showing a schematic view of a wellhead platform with a wellhead assembly 1 including an x-mas tree, a flowline 2 in which produced fluids from the well are flowing to any process components such as meters, valves, sensors, manifolds, vessels, mechanical equipment or process assemblies 3 to 6.

The x-mas tree is a conventional x-mas tree with a wing valve 11 arranged at an outlet point A of the wellhead assembly 1. The process components 3-6 may or may not be located in high points with pocketed piping P as shown in the FIG. 1. The low level pockets P means any pipeline segment arranged between the process equipment 3-6 or within a process equipment 3-6 that are arranged in a level lower than the connecting process equipment and the remaining pipeline segments 2a as illustrated in the FIG. 1. Pockets are short-circuited to downstream pipeline segment 2a by use of automated valve(s) 7 and associated piping 12. Extracted fluids are produced to the transport pipeline 8. In this way, the drained fluid is from pocketed piping P is drained directly to a lower piping segment 2a. The fluid would otherwise be captured in the pockets with no possibility to drain back to the wellhead assembly 1 or to the transport pipeline 8.

At least one of the process equipment must be higher than the outlet A and B so that the fluid is allowed to drain back to the wellhead assembly 1 or the transport pipe 8.

Figure 2:
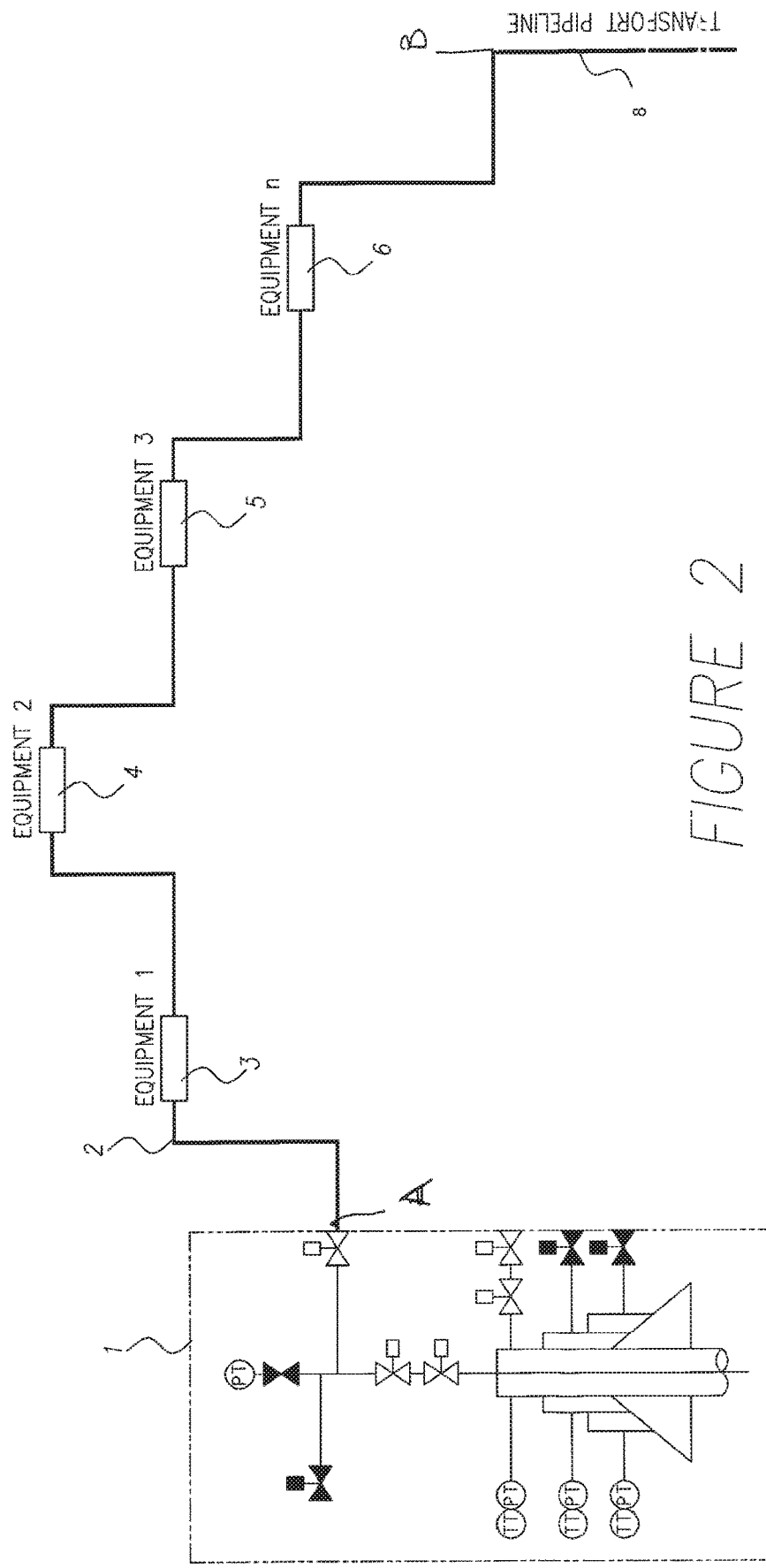
FIG. 2 shows in schematic view a wellhead platform similar to FIG. 1, but omit the pocketed piping and short circuiting lines.

FIG. 2 shows a schematic of a wellhead platform with a wellhead assembly 1 including an x-mas tree, a flowline 2 in which produced fluids from the well are flowing to any process components such as meters, valves, sensors, manifolds, vessels, mechanical equipment or process assemblies 3 to 6. The process components may or may not be located in high points with continuously sloping piping to either side to facilitate accumulation of liquid in the well1 and transport pipeline 8 respectively. The local high point may be any of the installed equipment 3-6. In this embodiment, the fluid in the flowline 2 and process equipment 3-6 follows the flowline to the transport line or back to the wellhead when the arrangement is drained. The flowline do not contain any low level pockets P as in the first embodiment in FIG. 1. As in FIG. 1, at least one of the process equipment must be higher that the outlet A and B so that the fluid is allowed to drain back to the wellhead assembly 1 or the transport pipe 8.

Figure 3:
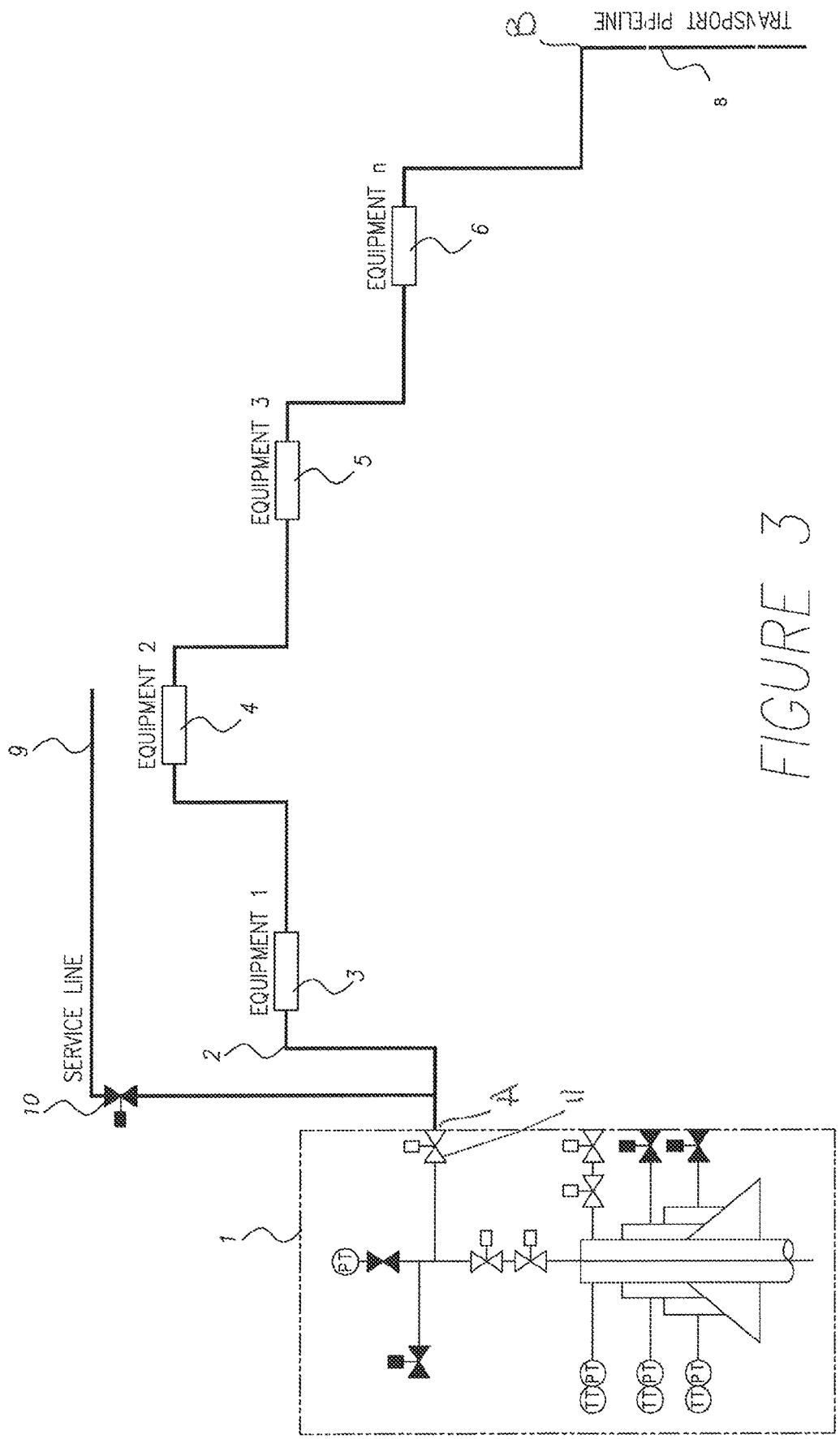
FIG. 3 shows a schematic view of the well head assembly from FIG. 2 with a service line 9 attached to the wellhead assembly.

FIG. 3 shows the well head assembly 1 shown in FIG. 2 with a service line 9 attached to the wellhead assembly 1.

The service line 9 is well known equipment per se and is for instance disclosed in publication U.S. Pat. No. 6,397,948.

The service line 9 is arranged so that during a shutdown of the assembly, once the flowline 2 and the process equipment have been drained of liquid, the service line 9 can be used to depressurize the system by providing an outlet for gas.

This may be achieved by opening a valve 10 on the service line 9. The valve is opened once the system has been drained of liquid. The service line 9 is attached to the wellhead assembly 1 in the proximity of the outlet of the wellhead assembly A as illustrated in the FIG. 3. This is also in the proximity of a wing valve 11 arranged in connection with the wellhead assembly 1.

The service line 9 can then act as an outlet vent for the pressurized gas in the wellhead assembly 1.

The opposite end of the service line 3 leads to a system for depressurizing. This could for instance be a facility.

The service line 9 could also be arranged so that it can be used to provide chemicals to the flowline 2 and process equipment 3-5. The service line 9 may also be arranged so that it can be used to depressurize the flowline 2 and process equipment 3-5 after a shutdown of the assembly 1.

The service line 9 is illustrated in relation to the embodiment in FIG. 2 but is equally applicable together with the embodiment of FIG. 1.

The invention claimed is:

1. An arrangement of an unmanned and remotely operated production facility, the arrangement comprising:
   a wellhead platform including a wellhead assembly having a X-mas tree and a wellhead-assembly outlet point (A);
   a flowline starting from the wellhead-assembly outlet point (A) from the X-mas tree and transporting hydrocarbon fluids produced from a well via the wellhead assembly to consecutive process equipment, and further on to a destination via a transport pipeline;
   wherein said transport pipeline starts at a point B located at a level lower than the wellhead outlet point A;
   wherein at least one of the process equipment and a pipeline section is located at a higher level than the wellhead-assembly outlet point A or the transport pipeline starting point B so that the hydrocarbon fluids drain back to the X-mas tree or drain downstream to the transport pipeline at least in part via valves and associated piping arranged with the respective process equipment along the flowline; and
   wherein the associated piping is not in the flowline.

2. The arrangement according to claim 1, wherein the process equipment comprises at least one of meters, valves, sensors, manifolds, vessels, mechanical equipment, and process assemblies.

3. The arrangement according to claim 1, wherein a pipeline section between or within process equipment is arranged at a level lower than the process equipment and is connected to a lower pipeline section by use of respective actuatable short circuit valve and the associated piping conducting fluids to a lower level.

4. The arrangement according to claim 3, wherein the lower pipeline section is arranged upstream.

5. The arrangement according to claim 3, wherein the lower pipeline section is arranged downstream.

6. The arrangement according to claim 1, wherein the production facility comprises a manifold receiving fluid from one or more additional wells and route to transport pipeline for transport to destination.

7. The arrangement according to claim 1, wherein the destination is a processing facility.

8. The arrangement according to claim 1, wherein the arrangement comprises a service line connected to the flowline for depressurizing the flowline and the process equipment after shutdown of the assembly.

9. The arrangement according to claim 8, wherein the service line is connected to the flowline at the proximity of the outlet point from said wellhead assembly (A).

\* \* \* \* \*